(12) United States Patent
Happel (10) Patent No.: US 10,287,768 B1
(45) Date of Patent: May 14, 2019

(54) STORMWATER VAULT APPARATUS AND METHOD

(71) Applicant: Thomas H Happel, Cocoa, FL (US)

(72) Inventor: Thomas H Happel, Cocoa, FL (US)

(73) Assignee: Suntree Technologies Holdings LLC, Cocoa, FL (US)

( * ) Notice: Subject to any disclaimer, the term of this patent is extended or adjusted under 35 U.S.C. 154(b) by 0 days.

(21) Appl. No.: 15/634,531

(22) Filed: Jun. 27, 2017

Related U.S. Application Data (63) Continuation-in-part of application No. 14/288,455, filed on May 28, 2014, now abandoned.

(60) Provisional application No. 61/828,958, filed on May 30, 2013.

(51) Int. Cl.
| | | |
|---|---|---|
| *E03F 5/14* | (2006.01) | |
| *B01D 21/24* | (2006.01) | |
| *E03F 5/10* | (2006.01) | |
| *B01D 21/02* | (2006.01) | |
| *B01D 21/00* | (2006.01) | |
| *B08B 9/08* | (2006.01) | |
| *B08B 9/093* | (2006.01) | |
| *E03F 5/04* | (2006.01) | |

(52) U.S. Cl.
CPC .......... *E03F 5/108* (2013.01); *B01D 21/003* (2013.01); *B01D 21/02* (2013.01); *B01D 21/2472* (2013.01); *B01D 21/2483* (2013.01); *B08B 9/0856* (2013.01); *B08B 9/0933* (2013.01); *E03F 5/0403* (2013.01); *E03F 5/101* (2013.01); *E03F 5/106* (2013.01); *E03F 5/14* (2013.01)

(58) Field of Classification Search
CPC ......... E03F 5/0403; E03F 5/101; E03F 5/106; E03F 5/108; E03F 5/14; E03F 7/10; B01D 21/2472; B01D 21/2483; B08B 9/0856; B08B 9/093; B08B 9/0933
USPC ........ 210/170.03, 523, 747.2, 803; 134/22.1, 134/22.18, 171
See application file for complete search history.

(56) References Cited

U.S. PATENT DOCUMENTS

| | | | | |
|---|---|---|---|---|
| 1,561,744 | A * | 11/1925 | Raymond ................ | E03F 7/10 210/532.1 |
| 3,586,294 | A * | 6/1971 | Strong ................ | B08B 9/0933 366/163.2 |
| 4,024,881 | A | 5/1977 | Weiland et al. | |
| 5,613,510 | A * | 3/1997 | Proctor ................ | B08B 9/093 134/166 R |
| 6,125,865 | A * | 10/2000 | Bacon Cochrane .. | B08B 9/0933 134/169 R |
| 7,959,741 | B2 * | 6/2011 | Green ................ | B08B 9/0933 134/22.1 |
| 2008/0006304 | A1 * | 1/2008 | Treherne ............ | B01D 21/2472 210/513 |
| 2014/0102479 | A1 * | 4/2014 | Steffen ................ | B08B 9/0933 134/10 |

(Continued)

*Primary Examiner* — Christopher Upton
(74) *Attorney, Agent, or Firm* — William M. Hobby, III

(57) ABSTRACT

A stormwater vault and a process for servicing the stormwater vault speeds the process of cleaning the stormwater vault. The stormwater vault has a built in liquefaction system for liquefying settled debris in the vault which works together with a sloped or angled floor in the vault and vertical debris cutting spray nozzles. The settled debris is flushed toward the inlet to a vacuum removal line inserted into the vault through an access opening for removing the settled debris from the vault while compacted debris is collapsed by vertically extending water nozzles.

18 Claims, 9 Drawing Sheets

(56) References Cited

U.S. PATENT DOCUMENTS

2014/0352729 A1* 12/2014 Happel .................. E03F 5/108
                                                    134/21
2016/0361669 A1* 12/2016 Hur .................... B01D 21/2472
2017/0136509 A1*  5/2017 Happel .................. E03F 5/108

* cited by examiner

STORMWATER VAULT APPARATUS AND METHOD

This is a continuation-in-part of application Ser. No. 14/288,455, filed May 28, 2014, which application claims the benefit of U.S. Provisional Application No. 61/828,958, filed May 30, 2013 for Stormwater Vault Apparatus and Servicing Process.

BACKGROUND OF THE INVENTION

Stormwater treatment systems typically remove solids from stormwater flow. These solids represent a major portion of the pollutant load contained in stormwater runoff. Current federal, state and local stormwater treatment guidelines require that all stormwater runoff receive treatment to prevent the conveyance of pollution to downstream receiving water bodies.

In an attempt to quantify the effectiveness of stormwater treatment solutions, the debris collected in devices that treat stormwater is removed during servicing and analyzed. A major factor in determining the effectiveness of a stormwater treatment device is the amount by weight of the debris removed during servicing. Therefore the greater the amount of debris removed from a device by weight increases its effectiveness.

Servicing a stormwater treatment device requires both human, equipment, and financial resources. Being able to service frequently will yield the capture of more debris, and being able to service quickly with a minimum human and investment will reduce the investment of servicing. In addition, because the environment of stormwater treatment systems is dynamic with the potential of flowing water during servicing, servicing quickly can make a major difference as to whether or not a device is serviceable.

Another issue in servicing is the need to accomplish servicing without having to enter the vault of the stormwater treatment system. It is typical to send a person into a stormwater treatment vault with a handheld spray wand to flush debris toward a mobile vacuum system that removes the debris to a truck. Confined space guidelines set by OSHA dictate that when a person enters a confined space, such as a stormwater vault of a stormwater treatment system, the person entering the vault should be certified to do so and that special safety equipment must be present. Not just anyone can do confined space work and the safety routines can be complicated. The confined space issue can be a barrier to accomplishing the servicing of a stormwater treatment system.

It is typical for a vacuum service truck to have a water supply in an onboard tank that is used to flush debris as needed and generally wash things off. However, the supply of water on the vacuum truck is limited and can run out during the servicing of a stormwater treatment system. If the vacuum truck has to leave the service site to restock its water tank, the loss of time can be significant. To abandon the site to restock the water tank would not only take time but would require the treatment system to be closed up and secured out of safety concerns to the public. In addition, water intrusion into the treatment system while the vacuum truck was away would have to be dealt with which would take additional time and resources.

The prior Weiland et al. U.S. Pat. No. 4,024,881, is for an apparatus for removing gelatinous sludge and solids from a settling basin. Steams of liquid directed into contact with the sludge are used to produce a laminar flow of the sludge toward a withdrawal point.

The present stormwater treatment vault is designed to increase the speed of servicing, use less water to do the servicing, and not require a person to enter the stormwater treatment vault to do the servicing. A primary feature that makes this all possible is the liquefaction of the captured debris from a spray system underneath the collected debris in a vault shaped to direct the debris to a collection point to be removed by a vacuum line. A problem with this system is that as the debris accumulates in the settling chamber it can become highly compacted so that the jets of water applied along the floor of the vault chamber undermines the sediment without the majority of sediment collapsing to the floor and thus creates a bridge of compacted debris over the water jets. In the present system vertical cutting water jets act like a knife to cut into the compacted bridge of sediment which then collapses the bridge of compacted debris that has formed in the vault over the floor water jets. Once the compacted debris has collapsed, the water jets along the floor can drive the collapsed debris to a collection point along an angled floor to a position for pickup by a vacuum hose from a vacuum truck.

SUMMARY OF THE INVENTION

A present stormwater vault has a vault having an interior chamber formed with at least one wall and has a sloped floor for directing settling debris entering the vault towards a debris collection area in the vault. The vault has a roof having an access entrance therethrough for a inserting a vacuum hose from a vacuum truck to remove settled debris in the vault. The vault has a stormwater inlet thereinto and an outlet therefrom. A water spray bar or pipe has a plurality of generally parallel outlets or nozzles 33 for producing jets of water therefrom mounted in the bottom portion of the vault interior chamber along a wall and positioned for flushing debris settled in the vault chamber along the vault sloped floor. A plurality of vertical extending spray bars, each having a plurality of generally parallel water outlets is operatively coupled to the floor spray bar and extending generally perpendicular thereto with each outlet being generally perpendicular to the floor spray bar outlets for a generally vertical cutting or slicing into accumulated compacted debris to collapse the compacted debris in the vault interior chamber. A supply pipe is located in the vault interior chamber and connected to the water bar and has a supply pipe having a water line coupling thereon positioned for coupling the water line thereto from outside the vault. The settled debris in the storm water vault interior chamber can be flushed to a predetermined position and removed through the vault roof access entrance.

A method of cleaning a stormwater vault includes selecting a stormwater vault having an interior chamber and having a stormwater inlet thereinto and an outlet therefrom. The vault has a roof having an access entrance thereinto and has a sloping floor. A floor spray bar with a plurality of parallel outlets is mounted in the bottom portion of the vault chamber and positioned for flushing debris settled in the vault chamber along the sloped floor to a predetermined location for pickup by a vacuum hose. A water supply pipe is located in the vault chamber to supply water to the floor spray bar and has a water coupling thereon positioned for attaching a water line thereto from outside the vault. The floor spray bar has a generally vertical extending debris cutting spray bar having a plurality of generally parallel outlets operatively coupled thereto and extending generally perpendicular to the floor spray bar for producing a generally vertical slicing into compacted debris to collapse the compacted debris in the vault. The vault access entrance is opened and a water line connected to the water pipe coupling. Water under pressure is supplied into the floor spray bar to spray water out the floor spray bar outlets to move settled debris in the bottom of the vault chamber along the sloped floor towards the predetermined position for removal while a vertical stream of water from the vertical cutting spray bars is sprayed against any compacted settled debris that may form a bridge over the floor debris being flushed by the water jets. A vacuum suction line is inserted into the roof access entrance for drawing out settled debris from a collection area.

BRIEF DESCRIPTION OF THE DRAWINGS

The accompanying drawings, which are included to provide further understanding of the invention and are incorporated in and constitute a part of the specification, illustrate embodiments of the invention and together with the description serve to explain the principles of the invention.

DETAILED DESCRIPTION OF EXEMPLARY EMBODIMENTS

The present invention as seen in the drawings, FIGS. 1 through 11F, is for a system that will enable the servicing of a debris settling vault chamber to be serviced more quickly, use less water to perform the servicing, and avoid the need for a service technician to enter the settling chamber to perform the servicing. The accumulated and settled debris in a stormwater vault 15 chamber is flushed along angled floors 20 to a collection pickup point in the vault 15 where it can be vacuumed out with a vacuum line 24 passed through an access opening 18 in the roof of the vault 15.

In FIGS. 1 through 5 water under high pressure from a vacuum truck with a water supply hose is connected to a water connection coupling 14 just inside the access opening and pumped into the system through pipes 19 from equipment located at finish grade outside the vault 15. A vertical cutting spray bar of the sprayer system creates a vertical cut through the accumulated sediment and debris in the settling chamber. As debris accumulates in a settling chamber 16 in the vault 15 it can become highly compacted. In addition sediment, leaves and twigs will become integrated throughout the accumulated debris. The presence of leaves and twigs enhances the general structure of the accumulated debris.

During the servicing of the lower settling chambers 16 when the service system is powered on, the collected debris has the jet nozzles from the floor spray bar 17 aimed along the sloped or angled floor 20 of the chamber 16 which undermines any settled sediment in the chamber along the floor 20 without the majority of sediment collapsing to the floor. Essentially, what happens is that the structure of the sediment has compacted to allow the jets from floor spray bar 17 nozzles, which are aimed along the floor, to drill through the sediment close to the angled floor, while the compacted debris above the floor jets sometimes bridges between the solid walls of the vault 15 chamber 16 to support the bulk of the debris above the floor jets from floor spray bar 17. When debris bridging occurs the floor jets from floor spray bars 17 are not able to engage all the debris. Vertical extending spray bars 21 nozzles produce vertical cutting water jets, shown by arrows in the drawings. The vertical cutting jets of the sprayer system have the vertical spray bar 21 nozzles typically positioned approximately midway between two walls within the settling chamber 16 of vault 15. The vertical extending spray bars 21 produce a vertical high pressure spray jets from the vertical spray bar 21 nozzles aimed horizontally across toward the center of the settling chamber 16. When the servicing system is powered on, the vertical cutting spray bar will cut a vertical slice through the collected debris which has compacted into a bridge over the floor jets from floor spray bars 17. This vertical slice through the debris works in conjunction with the floor spray bars 17 to cause the structure of the debris to weaken and collapse. It should be noted that in some of the drawings, spray bars 21 are shown having auxiliary lets which are parallel to the floor spray bars 17 facing the sides of the walls of the vault. These auxiliary jets do not form a part of the present invention which is more clearly seen in connection with FIGS. 3 and 11A through 11F. The auxiliary lets when used merely clear the walls of the vault.

The floor spray bars 17 jets of water will work to undermine and liquefy the debris from underneath while the vertically extending cutting spray bar 21 slices a vertical cut across the approximate center of the debris. Once the slice from the vertical cutting spray bar 21 is adequately complete, the structure within the debris will fall causing the debris to collapse to the floor 20 of the vault 15. Once the potential for the debris to bridge between the walls of the vault is nullified, the floor spray bars 17 jets of water will be fully able to liquefy the debris from the underside and flush all the debris toward the point in the chamber where it can be vacuumed out.

One of the objectives of the present invention is to liquefy the sediment from underneath and thrust the debris toward the location in the settling chamber 16 where it can be vacuumed out by a vacuum truck vacuum line 24. This is accomplished by using water pumped into the servicing system at high pressure from equipment located outside the vault. Spray bars 17 having a series of parallel nozzles are positioned along the floor of the settling chamber 16. The water exiting the spray nozzles needs to be traveling at a sufficient velocity so that it can drill into the debris that has settled into the settling chamber 16. It is also important that the floor spray bar 17 nozzles be aimed parallel with the angled floor 20 of the settling chamber 16. If the nozzles of the floor spray bars 17 are not aimed parallel with the floor, performance deficiencies can occur. If the nozzles of the floor spray bars 17 are aimed too far upward, the water jets will miss much of the debris along the floor 20 of the settling chamber. If the nozzles are not able to engage the sediment along the floor it will not be able to thrust this debris toward the location in the settling chamber where it can be vacuumed out with the vacuum line 24. If the nozzles of floor spray bars 17 are aimed too low, the water jets will hit onto the floor 20 of the settling chamber 16. When the water jets hit the floor, the velocity of the water jets are significantly reduced and the water jets will not be able to adequately drill into the debris. The sloped floors 20 of the present system aid in conveying debris toward the location in the settling chamber 16 where it can be vacuumed out. A difficulty to overcome is that the angle of the sloped floors vary significantly due to differences in designs and workmanship increasing the time that it takes to install the system and increasing the expense of installation. The extra time to insure that the nozzles of a floor spray bar nozzles are aimed correctly can create delays along with the extra costs associated with these delays. Thus aiming arms 23 are a part of the floor spray bars 17. These aiming arms 23 are parallel precisely with the direction of the water jet nozzles in floor spray bars 17. The aiming arms 23 serves as a physical and visual indicator that ensures that the nozzles of spray bars 17 are aimed parallel with the angled floor 20 of the settling chamber 16. The technician installing the spray bars 17 simply needs to make sure the aiming arm 23 is pressed flat onto the sloped floor. Regardless of the angle of the floor 20, when the aiming arm 23 is pressed down onto the floor the nozzles will be parallel with the floor.

Figure 1:
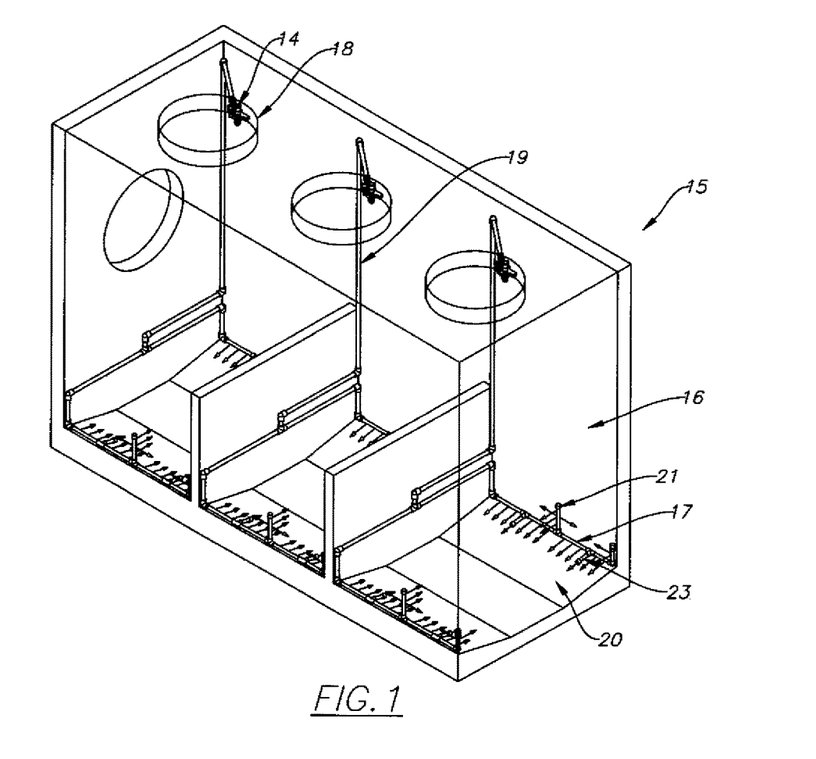
FIG. 1 is the cut-away perspective view of a stormwater vault in accordance with the present invention.
Figure 2:
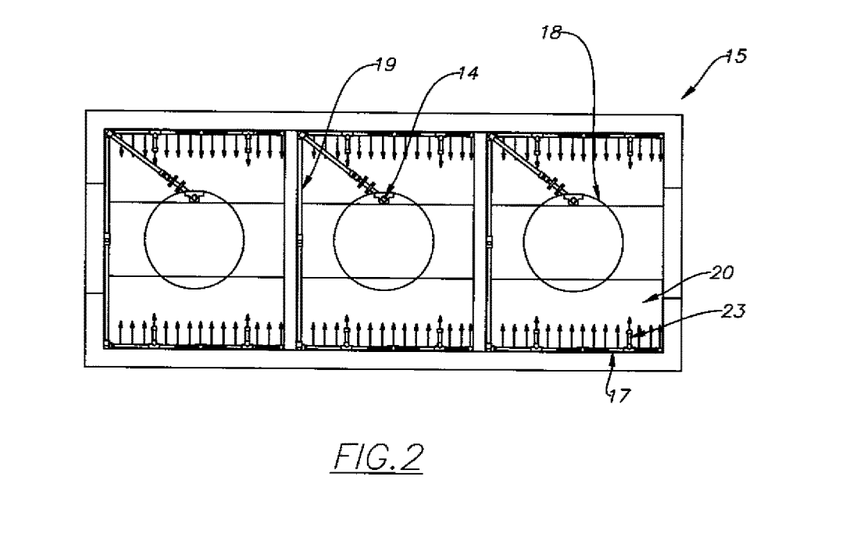
FIG. 2 is a top elevation of the stormwater vault of FIG. 1.
Figure 3:
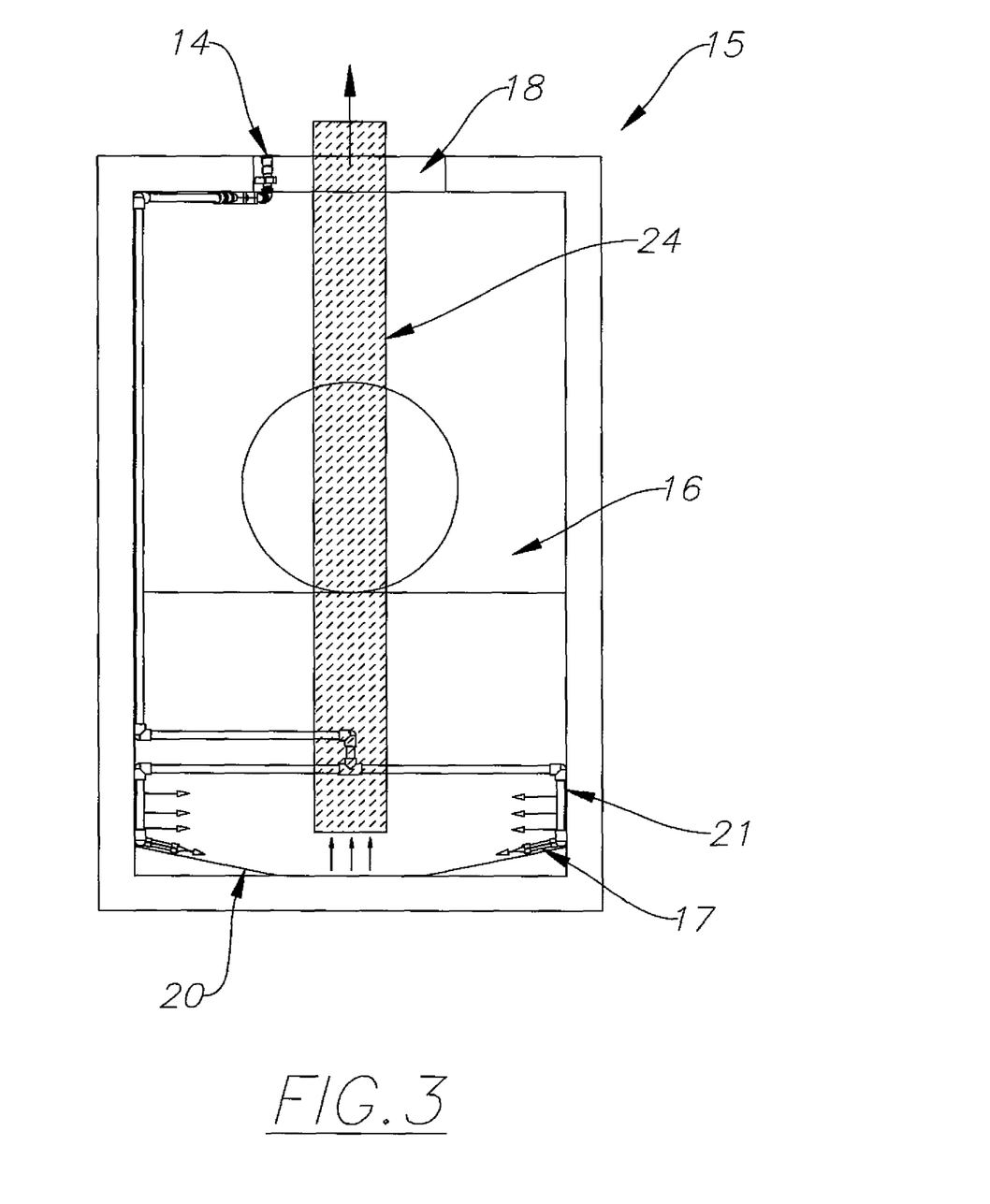
FIG. 3 is a sectional view of the stormwater vault of FIGS. 1 and 2.
Figure 4:
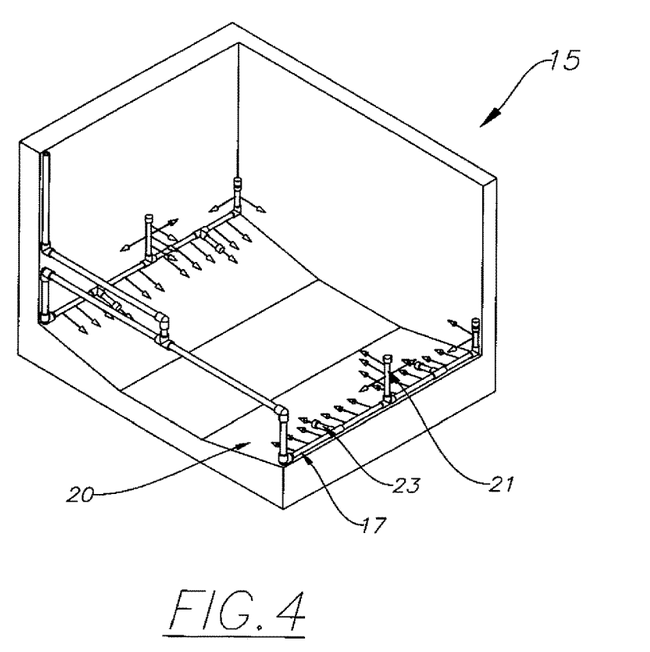
FIG. 4 is cut-away perspective of one chamber of the stormwater vault of FIGS. 1-3.
Figure 5:
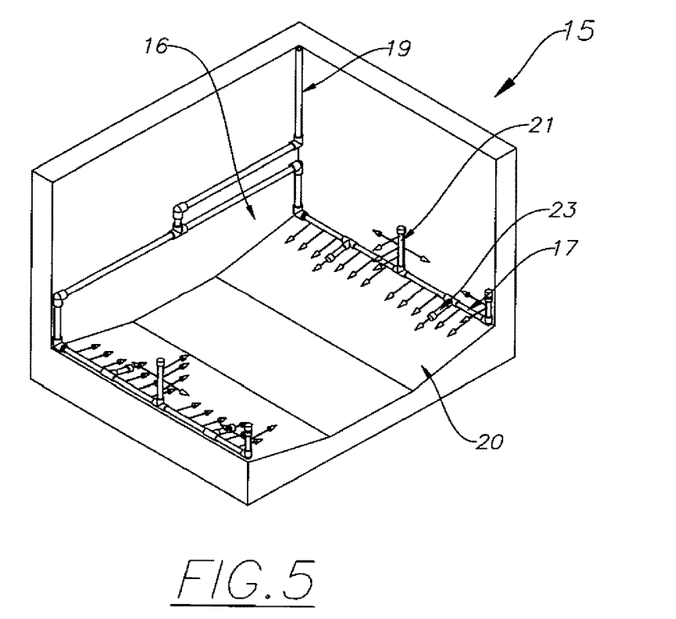
FIG. 5 is another cut-away perspective of another chamber of FIGS. 1-3.
Figure 6:
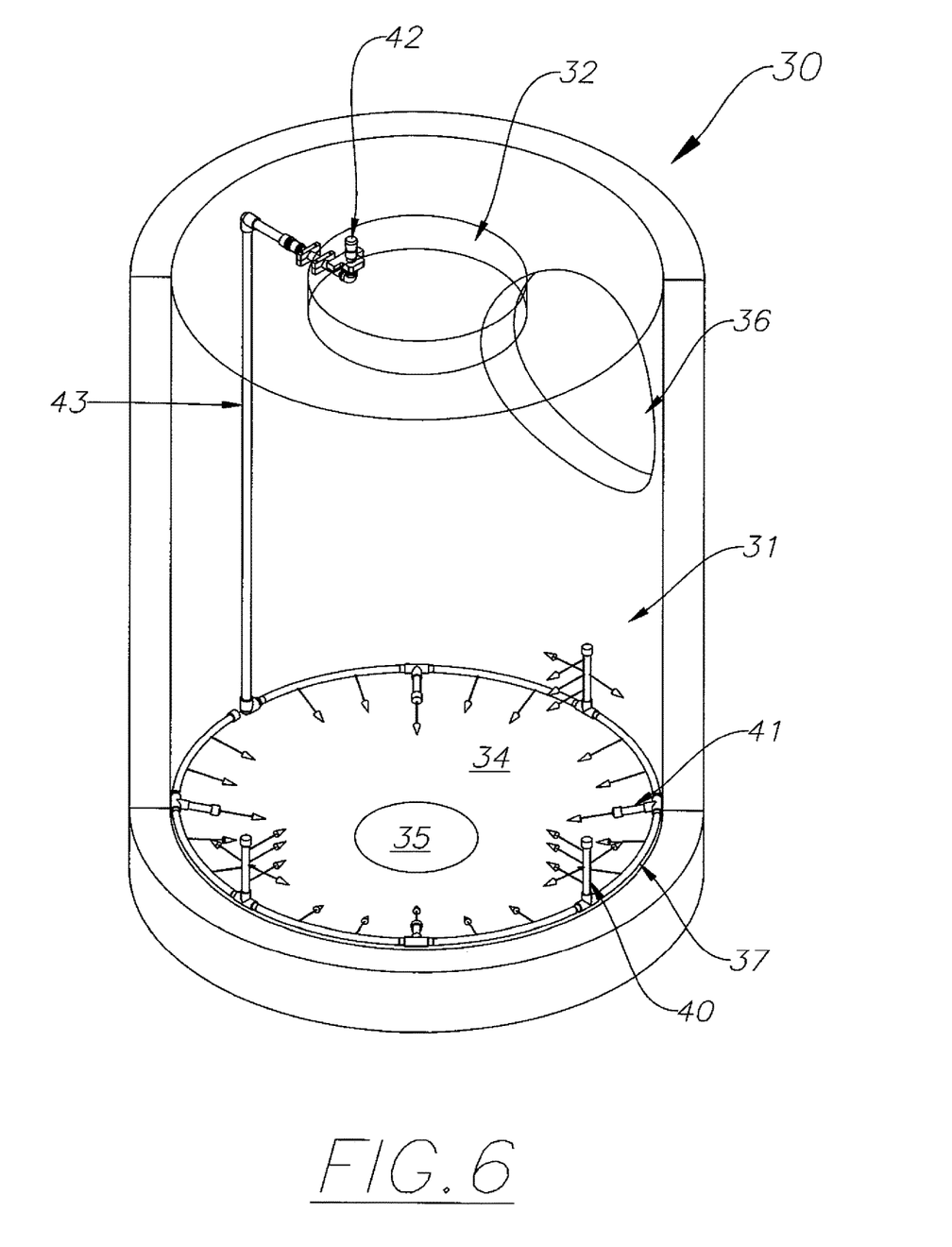
FIG. 6 is a cut-away perspective view of another embodiment of the stormwater vault in accordance with the present invention having arrows showing the spray pattern in a cylindrical stormwater vault.
Figure 7:
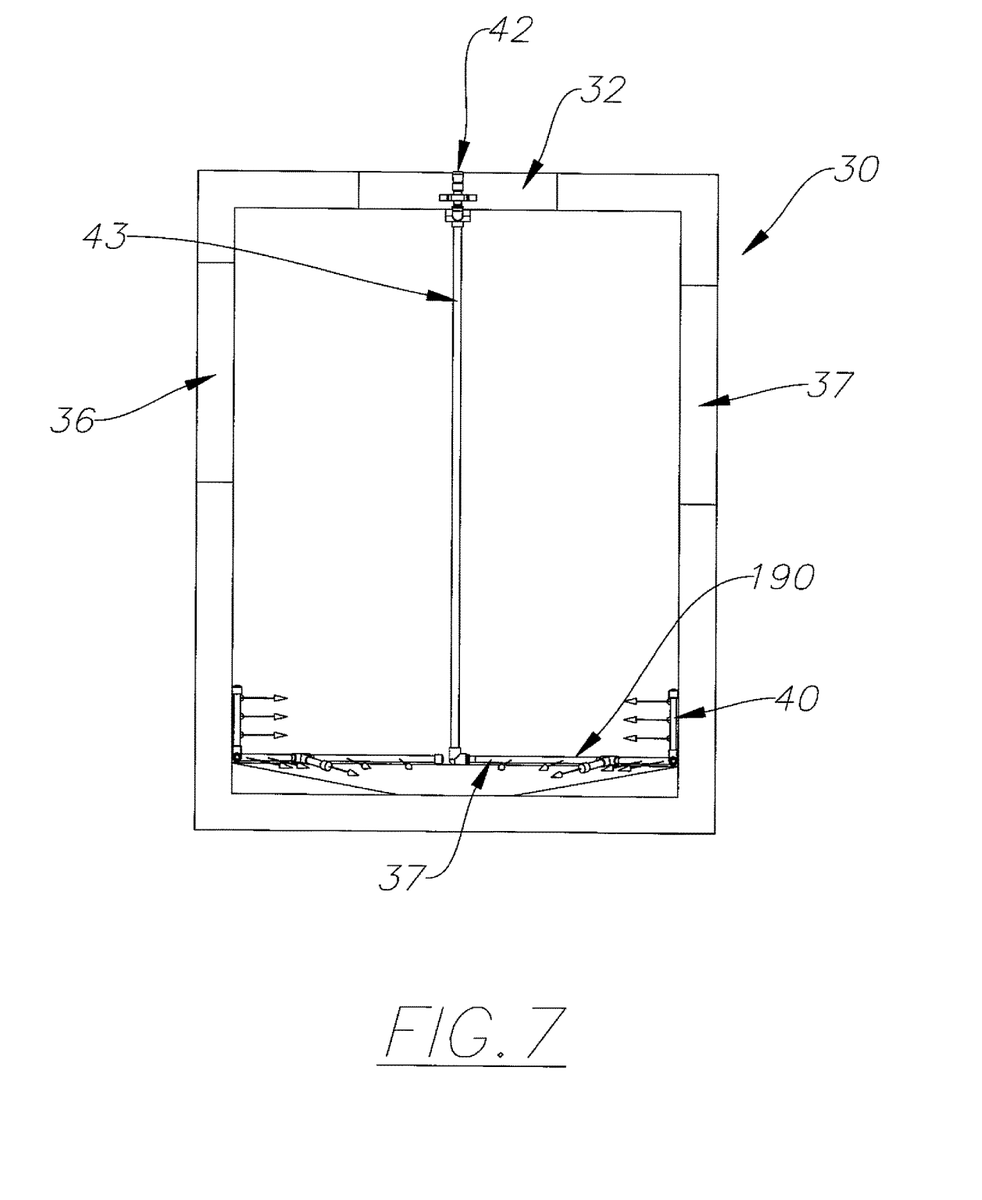
FIG. 7 is a side sectional view of the stormwater vault of FIG. 6.

FIGS. 6 and 7 shows another embodiment of the stormwater vault 30 which is of a generally cylindrical shape having a cylindrical settling chamber. The vault 30 has a settling chamber 31 having an access opening 32. The floor 34 of the vault 30 can be sloped by either forming the floor with a slope or by using an insert that attaches to the vault floor. The sloped floor 34 can be a generally truncated cone shape centered on the area 35 under the access opening 32 to the vault. The vault has an inlet opening 36 and an outlet opening 37. Round vaults can also have a concave or sloped floor 34. In a round vault the floor sprayer bar 37 is located at the top of the slope along the periphery of the wall. The vertical cutting spray bars 40 are positioned around the floor spray bar 37 for slicing into any compacted bridge of debris. The aiming arms 41 are also positioned around the spray bar 37 to align the spray bar nozzles to direct them along the angled floor 34. The water coupling 42 is located adjacent to the access manhole opening 32 and a high pressure pipe or hose 43 is used to convey water flow to the floor of the vault. When the water supply is turned on from the service truck, the spray bar will spray water along the floor of the vault to liquefy the sediment and cause it to flush toward a point under the access manhole 32 while the vertical cutting spray bars will slice into any compacted debris bridge that has formed causing it to collapse.

Figure 8:
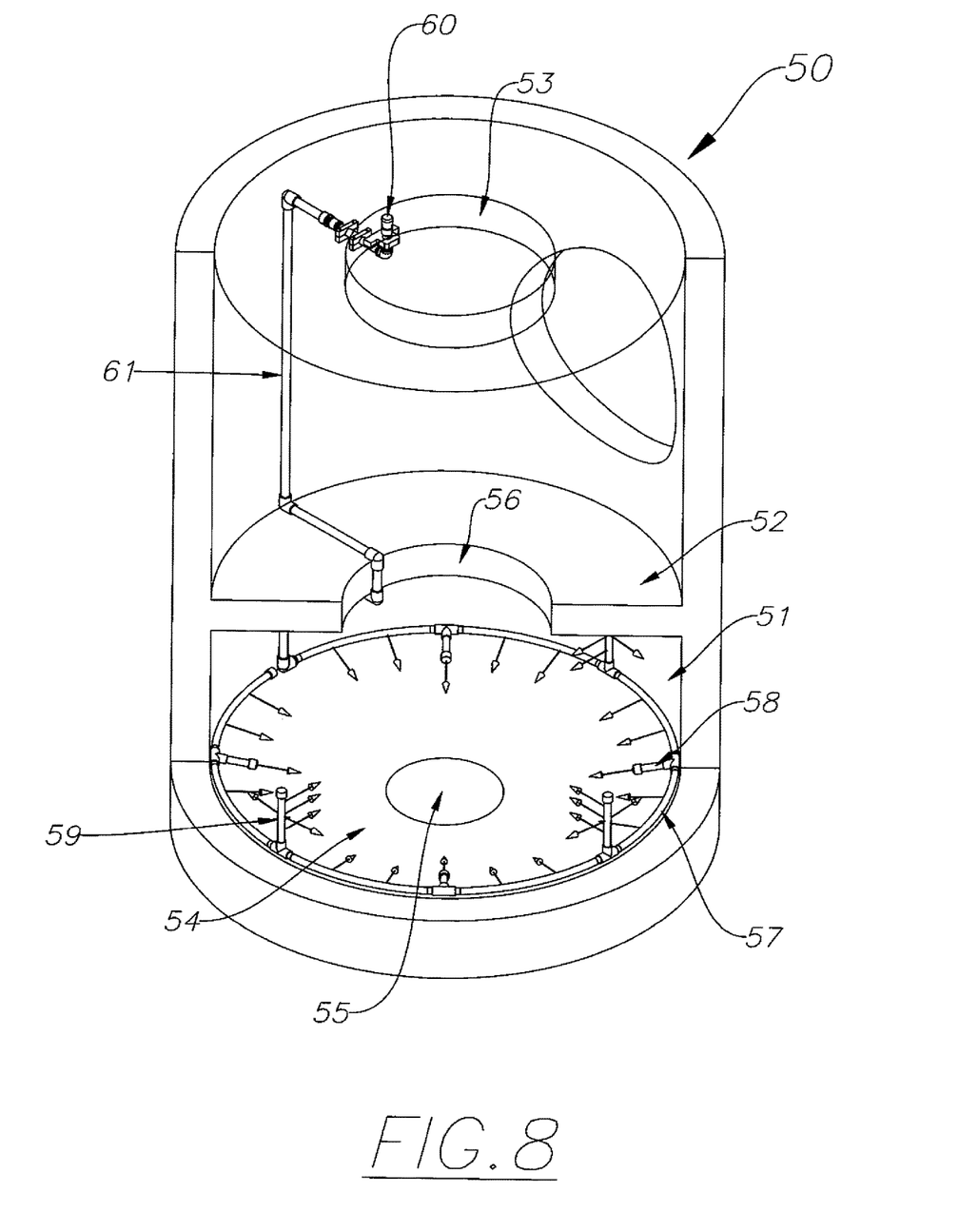
FIG. 8 is a cut-away perspective view of another embodiment of the stormwater vault in accordance with the present invention having arrows showing the spray pattern in a cylindrical stormwater vault.
Figure 9:
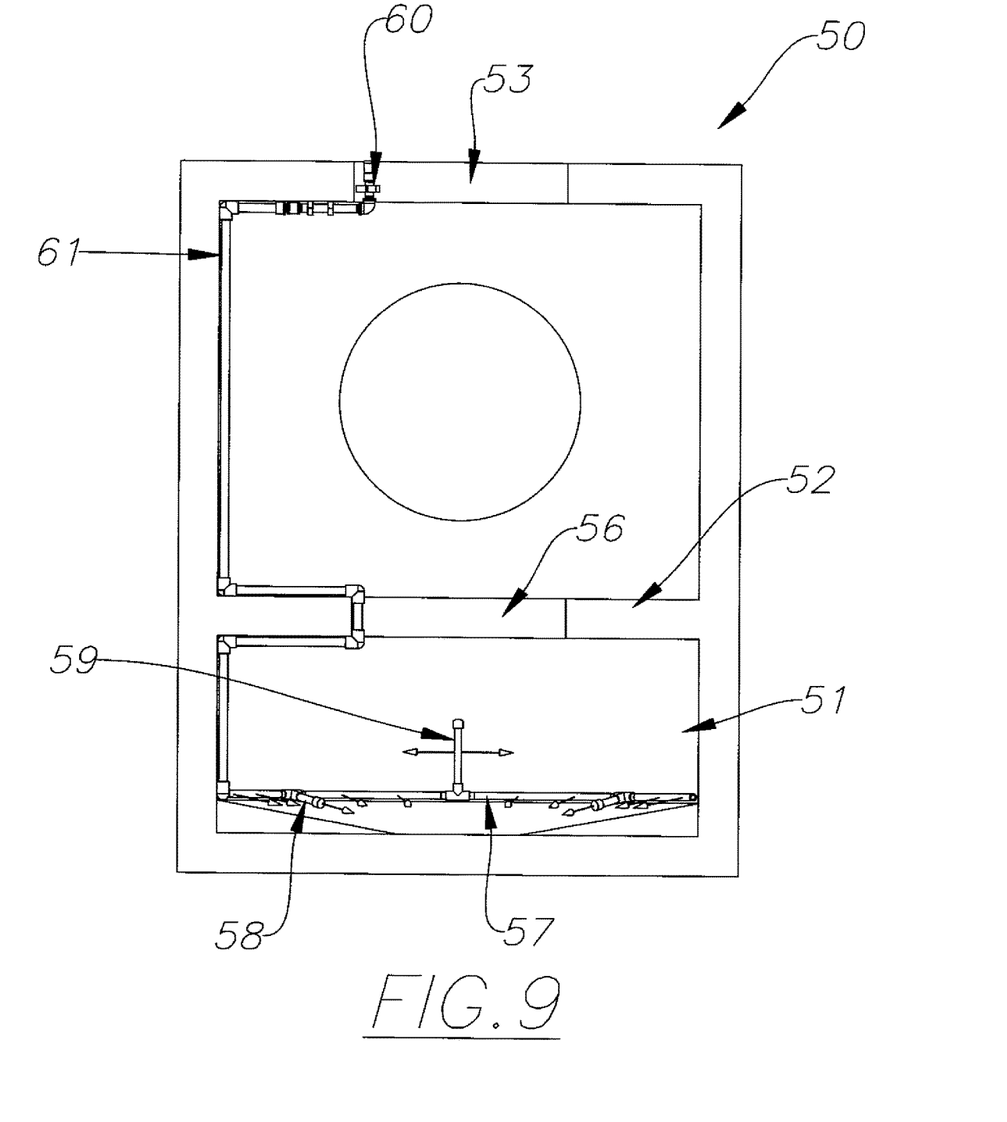
FIG. 9 is a side sectional view of the stormwater vault of FIG. 8 with spray direction arrows.

As seen in FIGS. 8 and 9, cylindrical wastewater treatment vaults 50 often have a settling chamber 51 separated from the flow above by a horizontal shelf 52. The horizontal shelf 52 will typically have an opening for sediments to settle through and for a service truck to access and vacuum out the captured sediments. The settling chambers of round vaults with horizontal shelves are especially difficult to service because the horizontal shelf restricts access to the settling chamber. FIGS. 8 and 9 illustrate a service system in a round treatment vault 50 with a horizontal shelf or ledge 52 above the settling chamber and is like the cylindrical vault of FIGS. 6 and 7 except for the addition of the shelf 52. The vault 50 has a settling chamber 51 having an access opening 53. The sloped floor 54 can be of a generally truncated cone shape centered on the area 55 under the shelf opening 56 and under the access opening 53 in the vault. The floor spray bar 57 is located at the top of the slope along the periphery of the wall and of the floor. The vertical cutting spray bars 59 are positioned around the floor spray bar 57 for slicing into any compacted bridge of debris. The aiming arms 58 are also positioned around the floor spray bar 57 to align the floor spray bar nozzles to direct them along the angled floor 54. The water coupling 60 is located adjacent to the access manhole opening 53 and a high pressure pipe or hose 61 is used to convey water flow to the floor of the vault. When the water supply is turned on from the service truck, the floor spray bar will spray water along the floor of the vault to liquefy the sediment and cause it to flush toward a point under the access opening 53 while the vertical cutting spray bars will slice into any compacted debris bridge that has formed causing it to collapse.

Figure 10A:
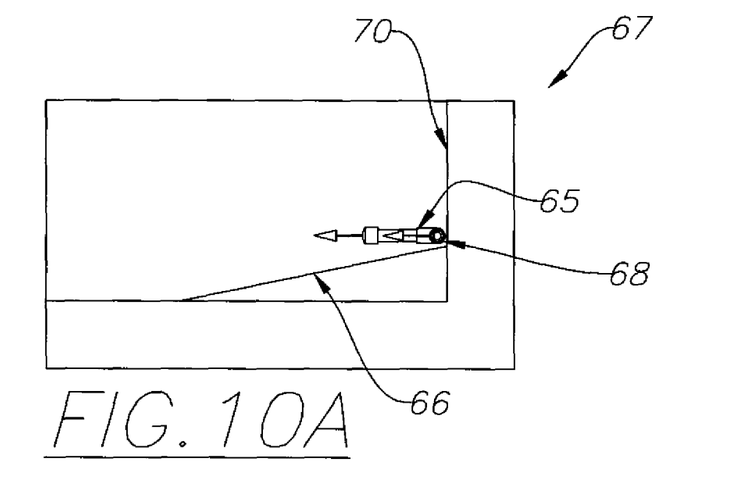
FIGS. 10A and 10B are side sectional views of details of the alignment arms used to assist in the installation of spray bars along the vault floor.
Figure 10B:
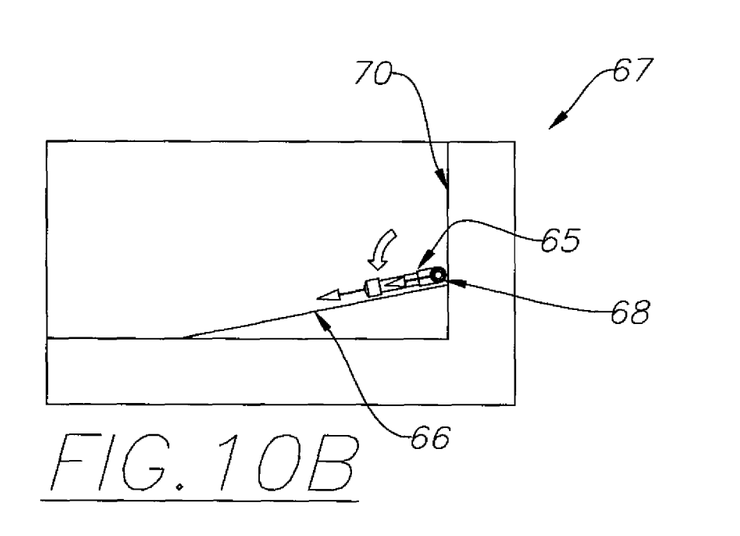

FIGS. 10A and 10B illustrates the aligning of the floor spray bar on the angled floor 66 in a vault 67. In FIG. 10A the floor spray bar 68 has been placed in the vault at the top of the angled floor 66 adjacent the vault wall 70 with the floor spray bar nozzles pointing horizontally. The aiming arm 65 is then moved down into contact with the sloping floor 66 in FIG. 10B to align the floor spray bar 68 nozzles to aim along the sloped floor.

Figure 11A:
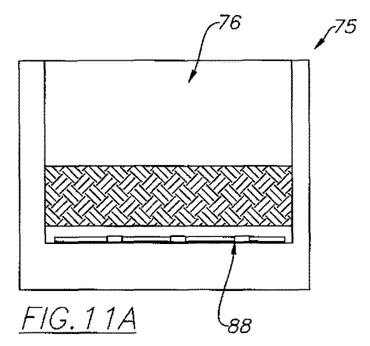
FIGS. 11A-11F are sectional views of a stormwater vault illustrating the steps in the collapsing of a compacted debris bridge that has formed in the vault in accordance with the present invention.
Figure 11B:
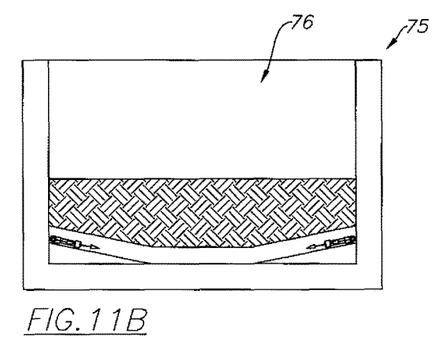
Figure 11C:
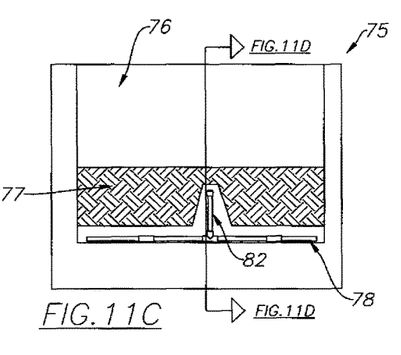
Figure 11D:
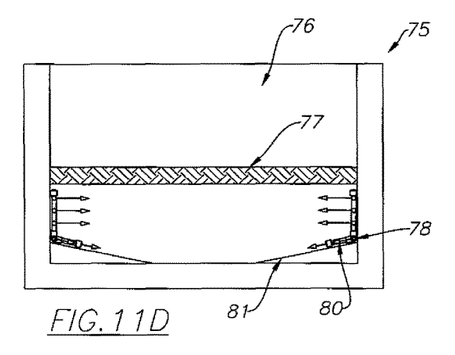
Figure 11E:
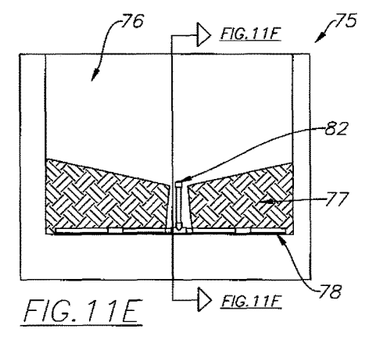
Figure 11F:
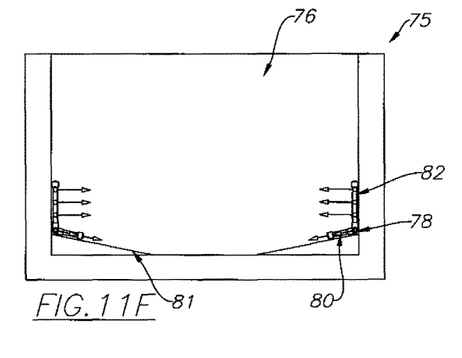

FIGS. 11A through 11F show the steps in diagram form of the removal of debris in a stormwater vault 75. In FIGS. 11A and 11B, the vault 75 chamber 76 has settled compacted debris 77 over the floor spray bar 78 which has flushed the debris toward a collection point while leaving a compacted bridge of debris above the floor 81. The floor spray bar nozzles have been aligned by the aiming arm 80 along the angled floor 81. In FIGS. 11C and 11D, the sectional views show the vertical cutting bar 82 having sliced into the bridge of compacted debris 77. FIGS. 11E and 11F show the debris 77 which has collapsed as a result of the cutting vertical spray bar 82 having cut into the compacted debris bridge.

To service a stormwater vault with the present invention, you have to first open the access opening in the top of the vault and attach a water supply hose to the water connection coupling just inside the access opening. You then lower a service vacuum line into the vault to remove the static water level over the top of the sediment and vacuum out the sediment directly under the access opening all the way to the floor of the vault to create a void within the sediment. The spray bar nozzles and vertical cutting bar nozzles are turned on while keeping the vacuum applied to the vacuum line. The water being injected under the sediment will liquefy the sediment causing the sediment to slide toward the end of the vacuum line while the vertical cutting spray bar will slice into any compacted debris bridge that may have formed where the vacuum line removes the sediment. Once all the sediment is removed, the sprayers and the vacuum are turned off.

It should be clear at this time that an improved stormwater vault and stormwater vault servicing process which enables the servicing of a debris settling chamber more quickly, using less water to perform the servicing, and avoiding the need for a service technician to enter the settling chamber to perform the servicing. It also advantageously creates a vertical cut through accumulated compacted sediment that may have formed a bridge over the sediment being flushed along the floor of the vault. However, it should be clear that the present invention is not to be considered as limited to the forms shown which are to be considered illustrative rather than restrictive.

I claim:

1. A stormwater vault comprising:
a stormwater vault having an interior chamber formed with at least one wall and a sloped floor for directing settling debris entering the vault towards a predetermined area in the vault and said vault having a roof having an access entrance therethrough, said vault having a stormwater inlet thereinto and an outlet therefrom;
a floor water spray bar has a plurality of generally parallel outlets therefrom mounted in the bottom portion of said vault interior chamber along at least one said wall and positioned for flushing debris settled in said vault chamber along said vault sloped floor;
a plurality of vertical extending water spray bars, each water spray bar being coupled to said floor spray bar and extending generally perpendicular thereto, and each said vertical spray bar having a plurality of outlets forming a generally vertical row of outlets, each said outlet being generally perpendicular to said floor spray bar for producing a generally vertical slicing into accumulated debris to collapse any compacted debris in said vault interior chamber; and
a water supply pipe located in said vault interior chamber and connected to said floor spray bar, said supply pipe having a water line coupling thereon positioned for coupling a water line thereto from outside said vault;
whereby settled debris in said storm water vault interior chamber can be flushed to a predetermined position and removed through said vault roof access entrance.

2. The stormwater vault in accordance with claim 1 in which said floor spray bar has a plurality of alignment arms extending therefrom extending generally parallel to said floor spray bar outlets for positioning said floor spray bar outlets in alignment with said vault sloped floor portion.

3. The stormwater vault in accordance with claim 2 in which said vault has a plurality of sloped floor portions for driving settled debris towards a predetermined area with water from said floor spray bar.

4. The stormwater vault in accordance with claim 3 in which said vault has two sloped floor portions for driving settle debris towards a predetermined area with water from said floor spray bar.

5. The stormwater vault in accordance with claim 3 in which said vault has an four sloped floor portions for driving settled debris towards a predetermined area with water from said floor spray bar.

6. The stormwater vault in accordance with claim 2 in which said vault has a generally concave floor portion for driving settle debris towards a predetermined area with water from said water bar.

7. The stormwater vault in accordance with claim 1 in which said vault has a plurality of connected settling chambers therein each having a floor spray bar having a plurality of outlets therein mounted therein and each having a sloped floor portion for driving settled debris towards a predetermined area with water from said floor spray bar mounted therein.

8. The stormwater vault in accordance with claim 7 in which each said vault plurality of connected settling chambers has a plurality of sloped floor portions for driving settled debris towards a predetermined area with water from said floor spray bar.

9. The stormwater vault in accordance with claim 7 in which each said vault plurality of connected settling chambers has a generally concave sloped floor portion for driving settle debris towards a predetermined area with water from said floor spray bar.

10. The stormwater vault in accordance with claim 1 in which said floor spray bar mounted in said vault chamber is generally mounted around the periphery of the floor portion of said vault chamber.

11. The stormwater vault in accordance with claim 10 in which said floor spray bar mounted in said vault chamber has a water pipe extending from the periphery mounted floor spray bar to the water line coupling.

12. The stormwater vault in accordance with claim 1 in which said vault is generally square in horizontal cross-section having four sides and a stormwater inlet in one side thereof and a stormwater outlet therefrom.

13. The stormwater vault in accordance with claim 1 in which said vault is generally cylindrical and has a stormwater inlet in the side thereof and a stormwater outlet in the side thereof.

14. A method of cleaning a stormwater vault comprising the steps of:
selecting a stormwater vault having an interior chamber and having a stormwater inlet thereinto and an outlet therefrom, said vault having a roof having an access entrance thereinto and said vault having a sloped floor and a floor spray bar having a plurality of parallel outlets therefrom mounted in the bottom portion of said stormwater vault chamber positioned for flushing debris settled in said vault chamber along said sloped floor to a predetermined location for pickup by a vacuum hose and having a water supply bar located in said vault chamber and connected to said floor spray bar and having a water pipe coupling thereon positioned for attaching a water line thereto from outside said vault, said floor spray bar having a generally vertical extending debris cutting spray bar, said debris cutting spray bar having a plurality of outlets forming a generally vertical row of outlets, each said outlet being generally perpendicular to said floor spray bar for producing a generally vertical slicing into compacted debris to collapse the compacted debris in said vault;
opening said vault access entrance;
connecting a water line to said water bar coupling;
applying water under pressure into said water bar to spray water out said floor spray bar outlets to move settled debris in said vault chamber along said sloped floor towards a predetermined position for removal and to spray a vertical stream of water from said from said vertical cutting spray bar into the settled debris;
inserting a vacuum suction line into said roof access entrance for drawing materials thereinto; and
withdrawing settled debris in the bottom portion of said vault chamber with said inserted vacuum line.

15. The method of cleaning a stormwater vault in accordance with claim 14 including the step of turning off the water from said water line and removing said vacuum suction line from said vault following removal of the settled debris therefrom.

16. The method of cleaning a stormwater vault in accordance with claim 15 in which the step of selecting a stormwater vault having a sloped floor portion includes selecting a vault having a generally concave floor portion.

17. The method of cleaning a stormwater vault in accordance with claim 15 in which the step of selecting a stormwater vault having a sloped floor portion includes selecting a vault having at least two sloped floor portions for driving settled debris to a predetermined point for pickup by said inserted vacuum line.

18. The method of cleaning a stormwater vault in accordance with claim 15 in which the step of selecting a stormwater vault having a floor spray bar having a plurality of outlets therefrom mounted in the bottom portion of said vault chamber and mounted generally around the periphery of the bottom portion of said vault chamber.

* * * * *